(12) United States Patent
Fan et al.

(10) Patent No.: US 9,513,636 B2
(45) Date of Patent: Dec. 6, 2016

(54) FLUID REGULATOR, ACTUATOR AND METHOD OF IMPROVING STABILITY OF A FLUID REGULATOR

(71) Applicant: EMERSON PROCESS MANAGEMENT REGULATOR TECHNOLOGIES, INC., McKinney, TX (US)

(72) Inventors: GuoLei Fan, Sichuan (CN); Biao Zhou, Sichuan (CN)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 213 days.

(21) Appl. No.: 13/796,823

(22) Filed: Mar. 12, 2013

(65) Prior Publication Data

US 2014/0083519 A1 Mar. 27, 2014

(30) Foreign Application Priority Data

Sep. 21, 2012 (CN) .......................... 2012 1 0353618

(51) Int. Cl.
| | |
|---|---|
| F16K 31/12 | (2006.01) |
| G05D 7/01 | (2006.01) |
| F16K 31/126 | (2006.01) |
| F16K 31/165 | (2006.01) |
| G05D 16/06 | (2006.01) |

(52) U.S. Cl.
CPC ......... *G05D 7/0106* (2013.01); *F16K 31/1262* (2013.01); *F16K 31/165* (2013.01); *G05D 16/0669* (2013.01); *G05D 16/0694* (2013.01); *Y10T 137/0491* (2015.04); *Y10T 137/7831* (2015.04)

(58) Field of Classification Search
CPC .................................................. Y10T 137/783
USPC ........................... 137/116.5, 505.26, 505.36, 505.37, 137/505.47, 505; 251/337
See application file for complete search history.

(56) References Cited

U.S. PATENT DOCUMENTS

| | | | | |
|---|---|---|---|---|
| 1,839,837 | A * | 1/1932 | Deming | .................... 137/505.46 |
| 2,191,333 | A * | 2/1940 | Willgoos | .................... 123/188.1 |
| 2,625,954 | A * | 1/1953 | Klein | .................. 92/96 |
| 2,710,163 | A * | 6/1955 | Mucller et al. | ................. 251/85 |
| 3,175,473 | A | 3/1965 | Boteler et al. | |
| 3,825,029 | A * | 7/1974 | Genbauffe | .................... 137/271 |
| 4,782,850 | A * | 11/1988 | Duffy et al. | ............... 137/116.5 |
| 5,131,425 | A * | 7/1992 | Sturgis | ........................ 137/116.5 |
| 5,755,254 | A * | 5/1998 | Carter | ................ G05D 16/0602 137/340 |
| 6,966,539 | B2 * | 11/2005 | Ucman | ......................... 251/337 |

(Continued)

OTHER PUBLICATIONS

International Search Report for International application No. PCT/US2013/060655, dated Nov. 26, 2013.

(Continued)

Primary Examiner — R. K. Arundale
(74) Attorney, Agent, or Firm — Marshall, Gerstein & Borun LLP (57) ABSTRACT

An actuator for a fluid regulator includes two or more control springs operatively connected to a diaphragm such that at least two of the control springs bias the diaphragm independently in parallel and have different natural frequencies. A method for retrofitting a prior art actuator to include a second control spring is also disclosed.

20 Claims, 3 Drawing Sheets

(56) References Cited

U.S. PATENT DOCUMENTS

2003/0034465 A1    2/2003   Adams et al.
2008/0258098 A1   10/2008   Hawkins et al.
2009/0261281 A1   10/2009   Mevius et al.

OTHER PUBLICATIONS

Written Opinion for International application No. PCT/US2013/060655, dated Nov. 26, 2013.
International Preliminary Report on Patentability for International application No. PCT/US2013/060655, dated Mar. 24, 2015.

* cited by examiner

FLUID REGULATOR, ACTUATOR AND METHOD OF IMPROVING STABILITY OF A FLUID REGULATOR

FIELD OF THE INVENTION

The present invention relates generally to an actuator for a fluid regulator, wherein the actuator has a plurality of springs operatively coupled to a diaphragm.

BACKGROUND

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of the end-user appliance. Therefore, process fluid regulators are implemented in these distribution systems in order to ensure that the delivered gas meets the requirements of the end-user facilities.

Process fluid regulators typically employed in such gas distribution systems are generally well known in the art. FIG. 1 shows a common process fluid regulator 10. The fluid regulator includes a regulator body 12, a control element 14, and an actuator 16. The regulator body 12 defines a fluid flow path 18 extending from a fluid inlet 20 to a fluid outlet 22 and through an orifice 24 operatively disposed between the fluid inlet 20 and the fluid outlet 22. The control element 14, such as a valve disk or plug, shifts to regulate the flow of fluid along the fluid flow path 18 through the orifice 24. The actuator 16 is operatively connected to the regulator body 12 to control the position of the control element 14 relative to the orifice 24. The actuator includes a housing 26, a diaphragm 28 disposed inside the housing 26, and a linkage operatively connecting the diaphragm 28 to the control element 14. The diaphragm 28 separates the housing 26 into a first chamber 30 hydraulically connected to the fluid outlet and a second chamber 31 hydraulically connected to the atmosphere. The linkage includes a lever 32 having a first end operatively connected to the diaphragm 28 and a second end operatively connected to a valve stem 34 operatively connected to the control element 14. Movement of the diaphragm 28 in response to pressure changes at the outlet 22 causes the linkage to shift the control element 14 in a manner to maintain a the process fluid pressure within a preselected range at the fluid outlet 22.

The actuator 16 includes a single control spring 36 that is operatively connected to the diaphragm 28. The spring 36 is arranged to bias the diaphragm 28 against the fluid pressure with a selected force so as to maintain the preselected pressure range at the fluid outlet 22. Typically, the force exerted by the control spring 36 can be adjusted with an adjusting screw 38. Adjustment of the adjusting screw 38 results in adjustment in the preselected range maintained at the outlet 22. This arrangement, with the single control spring 36, has an advantage of being simple to assemble and maintain and has been used extensively for many years. However, use of the single control spring 36 can inherently be prone to stability limitations at certain resonant frequencies, which may contribute to undesirable valve flutter under some operating conditions.

SUMMARY

According to some aspects of the present disclosure, an actuator for a fluid regulator includes two or more control springs operatively connected to the diaphragm and to one or more spring seat surfaces operatively connected to an actuator housing such that at least two of the springs bias the diaphragm independently in parallel. Preferably, at least two of the control springs have different spring constants and/or natural frequencies and dampen regulator instability.

According to one exemplary aspect, a fluid regulator includes a regulator body, a control element, and an actuator. The regulator body defines a fluid inlet, a fluid outlet, and a fluid flow path connecting the fluid inlet to the fluid outlet. The control element is disposed in the fluid flow path and arranged to shift between at least a first position and a second position to control flow of fluid through the fluid flow path from the fluid inlet to the fluid outlet. The actuator includes a housing, a diaphragm, a first spring seat, a first control spring, and a second control spring. The housing is operatively connected to the regulator body and forms a first chamber and a second chamber. The diaphragm separates the first chamber from the second chamber. A linkage operatively connects the control element to the diaphragm. The diaphragm is in fluid communication with the outlet and operatively arranged to move the control element in response to fluid pressure at the fluid outlet. The first control spring is operatively connected to the diaphragm and to the first spring seat and biases the diaphragm in a first direction. The second control spring is operatively connected to the diaphragm and to the first spring seat and biases the diaphragm in the first direction. Each of the first and second control springs biases the diaphragm independently of the other spring. The first and second springs have different natural frequencies.

According to another exemplary aspect of the disclosure, an actuator for a fluid regulator includes a housing, a diaphragm, a linkage, a spring seat, and first and second control springs for controlling movement of the diaphragm. The housing defines a first chamber and a second chamber. The diaphragm separates the first chamber from the second chamber. The diaphragm is formed of an air impervious flexible material and forms a movable pressure barrier between the first chamber and the second chamber. The linkage is adapted to operatively connect the diaphragm to a valve stem. The spring seat is disposed in the second chamber and operatively connected to the housing. Each of the first and second control springs is disposed in the second chamber and operatively connected to the diaphragm and to the spring seat. Each of the first and second control springs biases the diaphragm independently of the other spring.

According to a further exemplary aspect, a method of improving stability of a fluid regulator is disclosed. The method includes the step of providing a fluid regulator having a regulator body, a control element, and an actuator arranged to control flow of fluid through the regulator body, the actuator including a housing, a diaphragm disposed in the housing and operatively arranged to sense a fluid pressure within the regulator body, and a spring seat operatively connected to the housing. The method also includes the steps of providing a first control spring, wherein the first control spring is selected to have a first natural frequency, and providing a second control spring, wherein the second control spring is selected to have a second natural frequency, and wherein the second natural frequency is different than the first natural frequency. The method further includes the step of operatively coupling the first control spring to the diaphragm and to the spring seat and the step of operatively coupling the second control spring to the diaphragm and to the spring seat such that each of the first control spring and second control spring independently biases the diaphragm in parallel.

In further accordance with any one or more of the foregoing exemplary aspects, a fluid regulator optionally may include any one or more of the following further preferred forms.

In some preferred forms, each of the first and second control springs includes a coil spring. The first and second control springs may be operatively parallel with each other. The second control spring may be nested within the first control spring. The first control spring may have a first diameter, the second control spring may have a second diameter, and the second diameter may be smaller than the first diameter. The first and second control springs may be coaxial. The first and second control springs may have the same length or different lengths.

In some preferred forms, each of the first and second control springs may be disposed between and operatively engaged against a first spring seat and a second spring seat. The first spring seat may be a single component operatively connected to the housing or may be formed of separate components operatively connected to the housing. The second spring seat may be a rigid diaphragm plate connected with the diaphragm. The diaphragm plate may be disposed on the second side of the diaphragm. In some preferred forms, each of the first and second control springs has a different spring constant.

In some preferred forms, the first and second springs are arranged to prevent contact therebetween. One or more spacers may be disposed between the first control spring and the second control spring. The valve seat and/or the diaphragm plate may include separate spring seat surfaces for the first and second springs and/or may include one or more protrusions extending between the first control spring and the second control spring.

In some preferred forms, one or more adjusters are operatively connected to one or both of the first and second control springs and arranged to adjust compression and/or tension in one or both of the first and second control springs. The adjusters may include an adjusting screw operatively connected to a spring case encompassing the first and second control springs. The adjusters may be operatively connected to the first spring seat to move the second spring seat.

In some preferred forms, a lever linkage operatively connects the control element to the diaphragm. The fluid regulator may be a lever style direct-operated fluid regulator.

In some preferred forms, a valve stem operatively connects the control element directly to the diaphragm without a lever linkage. The fluid regulator may be a straight stem style direct-operated fluid regulator.

In some preferred forms, the fluid regulator is adapted for controlling flow of gases, such as natural gas, and/or liquids, such as water.

Additional optional aspects and features are disclosed, which may be arranged in any functionally appropriate manner, either alone or in any functionally viable combination, consistent with the teachings of the disclosure. Other aspects and advantages will become apparent upon consideration of the following detailed description.

DETAILED DESCRIPTION

Figure 2:
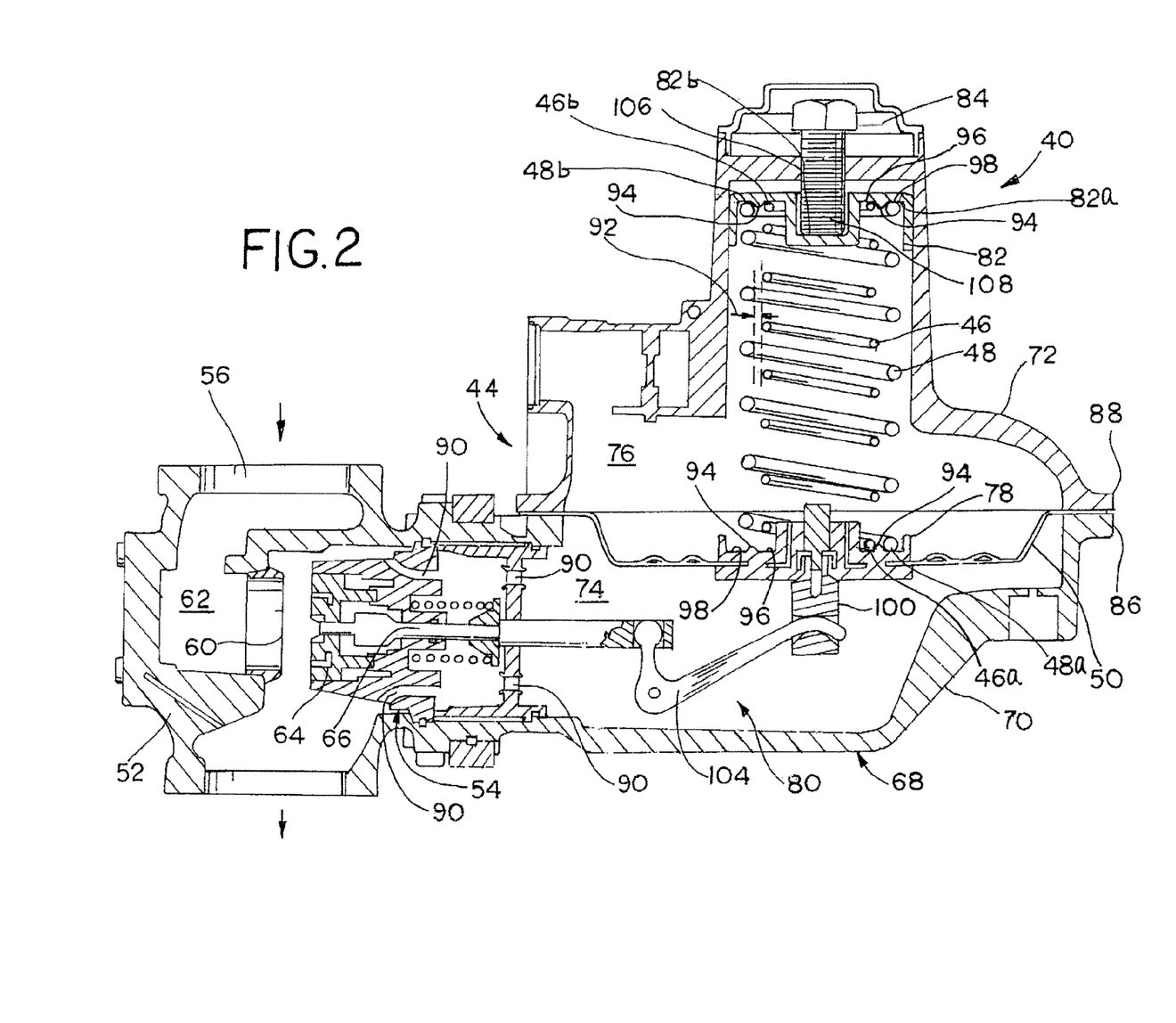
FIG. 2 is a cross-sectional view of a fluid regulator according to one exemplary arrangement of the present disclosure.

In the exemplary arrangement of FIG. 2, a fluid regulator 40 includes a regulator body 52, valve trim 54 disposed inside the regulator body, and an actuator 44 operatively connected to the regulator body 42 and the valve trim 54. The actuator 44 includes first and second control springs 46 and 48 operatively connected to a diaphragm 50 to independently bias the diaphragm 50 one direction against fluid pressure in the regulator body 42.

The regulator body 52 defines a fluid inlet 56, a fluid outlet 58, an orifice 60 between the fluid inlet 56 and the fluid outlet 58, and a flow passage 62 extending from the fluid inlet 56 to the fluid outlet 58 through the orifice 60. The valve trim 54 includes a control element 64 and a valve stem 66 operatively connected to the control element 64. The valve stem 66 is operatively connected to the control element 64 so as to shift with the control element 64 between a first position and a second position to control the flow of fluid, such as liquids and/or gases, through the orifice 60. In some arrangements, the first position is a fully closed position, wherein the control element 64 completely closes the orifice 60. The second position is a fully open position, wherein the control element 64 allows a maximum fluid flow through the orifice 60. In other arrangements, the first and second positions may only partially open and/or close the orifice 60. The exemplary fluid regulator 40 has a sliding valve; however, in other arrangements according to the present disclosure the fluid regulator 40 may have a rotary valve. The valve trim 54 includes additional components and features well understood in the art and not further described herein.

The actuator 44 includes a housing 68, including a first or diaphragm case 70 connected to the valve body 62 and a second or spring case 72 connected to the diaphragm case 70, the diaphragm 50 separating a first chamber 74 from a second chamber 76 inside the housing 68, a diaphragm head or plate 78 carried by the diaphragm 50, a linkage 80 operatively connecting the diaphragm 50 to the valve stem 66, the first and second control springs 46, 48, a spring seat 82, and an adjusting screw 84. The diaphragm case 70 forms the first chamber 74, the spring case 72 forms the second chamber 76, and the diaphragm 50 forms a movable pressure barrier between the first chamber 74 and the second chamber 76. The diaphragm 50 is secured between the diaphragm case 70 and the spring case 72, such as by being clamped between opposing flanges 86, 88 of the diaphragm case 70 and the spring case 72, respectively. The diaphragm 50 is preferably formed of an air impervious, flexible material, such as rubber, and/or a cloth laminated with an impervious covering. The diaphragm plate 78 is preferably made of a rigid material, such as steel or hard plastic. The first chamber 74 is in fluid communication with the fluid outlet 58 of the valve body 52, such as via one or more passages 90 extending from and/or connecting the first chamber 74 to an outlet side of the flow passage 62, whereby the first chamber 74 and the fluid outlet 58 are maintained at approximately the same pressure. In this arrangement, the diaphragm 50 responds to increased fluid pressure at the fluid outlet 58 by moving toward the second chamber 76.

The first and second control springs 46, 48 and the spring seat 82 are disposed in the second chamber 76. The first control spring 46 preferably has a different natural frequency than the second control spring 48. In some arrangements, the first control spring 46 has a first spring constant, and the second control spring 48 has a second spring constant different than the first spring constant. The control springs 46 and 48 are arranged in parallel, whereby each control spring 46, 48 independently biases the diaphragm 50 toward the first chamber 74. Preferably, each of the control springs 46, 48 is a coil spring. In the exemplary arrangement, the control springs 46, 48 are in a nested parallel arrangement. Preferably the first control springs 46 is coaxial with the second control spring 48. The first control spring 46 has a first end 46a and a second end 46b. The second control spring 48 has a first end 48a and a second end 48b. The first control spring 46 has a first diameter, the second control spring 48 has a second diameter larger than the first diameter, and the first control spring 46 is nested within the second control spring 48. The first control spring 46 is disposed inside and spaced radially inwardly apart from the second control spring 48.

The first end 46a, 48a of each control spring 46, 48 is operatively coupled to the diaphragm 50 so as to move in conjunction with the diaphragm 50, whereby movement of either of the diaphragm 50 or the first ends 46a, 46b of the control springs 46, 48 correlates directly with movement of other of the first ends 46a, 48a and the diaphragm 50. For example, each of the first ends 46a, 46b is seated against a spring seat formed or operatively carried by the diaphragm plate 78. Alternatively, one or both of the first ends 46a, 48a may be connected directly to the diaphragm 50 or one or both of the first ends 46a, 48a may be connected to another structure intermediate the first ends and the diaphragm 50 and/or the diaphragm plate 78.

The second end 46b, 48b of each control spring 46, 48 is operatively coupled to a spring seat that is operatively coupled to the housing 68. For example, each second end 46b and 48b is seated directly against a first side 82a of the spring seat 82, and the spring seat 82 is operatively coupled to the spring housing 72, for example, by way of an adjusting screw 106 engaging a second side 82b of the spring seat 82 as shown in FIG. 2, or the spring seat 82 may directly coupled to the spring housing 72 with a threaded connection (not shown). Further, the spring seat 82 may be separate from the spring case 72 as shown in FIG. 2, or the spring seat 82 may be integral with the spring case 72. Although the spring seat 82 is shown as a unitary cup-shaped body, the spring seat 82 in some arrangements may be formed of two or more separate portions defining different spring seat surfaces, wherein each separate portion is operatively connected to the housing 68, either independently from each other or in combination with each other.

The control springs 46, 48 may have the same lengths between the first ends 46a, 48a and the second ends 46b, 48b. Alternatively, the first control spring 46 may a first length, and the second control spring 48 may have a second length different than the first length. The spring seat 82 and/or the diaphragm plate 78 may have one or more seating surfaces that are either co-planar, as shown in the exemplary arrangement, or disposed in different planes, for example, to accommodate control springs of different lengths.

Optionally, one or more additional control springs (not shown) may be disposed in parallel with the first and second control springs 46, 48 to bias the diaphragm 50 toward the first chamber 74. Additional spring seats 82 or modifications to the spring seat 82 may be made to accommodate any additional control springs.

The control springs 46 and 48 preferably are maintained spaced apart from each other by a radial space, or gap 92 such as by one or more spacers 94 disposed between the outer diameter of the first control spring 46 and the inner diameter of the second control spring 48, to allow the control springs 46, 48 to act independently against the diaphragm plate 78. The spacers 94 may take the form one or more protrusions defined by the diaphragm plate 78 and/or the spring seat 82 extending into the gap 92 between the first control spring 46 and the second control spring 48, first and second spaced apart spring seat surfaces, such as seating grooves 96, 98, defined in the surfaces of the diaphragm plate 78 and/or the spring seat 82 to separately receive the first and second springs 46, 48, and/or by one or more other structures disposed in the radial space 92 between the control springs 46, 48.

Optionally, a known relief valve (not shown) may also be carried by the diaphragm 50. As is well known in the art, the relief valve may include a relief valve seat separably covering a first side of an aperture through the diaphragm 50, a relief valve spring seat separably covering a second side of the aperture through the diaphragm 50, a stem connected to the relief valve seat by a pusher post, an upper spring seat carried by the stem, and a relief valve spring biased against the spring seat and the relief valve spring seat. The relief valve may be nested coaxially within the first and second control springs 46, 48, for example, with the stem, the upper spring seat, and the relief valve spring arranged spaced coaxially inside the inner diameter of the control spring 46.

The linkage 80 is operatively arranged such that movement of the diaphragm 50 toward the second chamber 76 in response to increased fluid pressure at the fluid outlet 58 shifts the control element 64 toward the closed position, and such that movement of the diaphragm 50 by the control springs 46, 48 toward the first chamber 74 in response to a decrease in fluid pressure at the outlet 58 shifts the control element 64 toward the open position. Thus, the actuator 44 is arranged to maintain fluid pressure at the fluid outlet 58 at a preselected pressure or within a preselected pressure range, also called a set pressure. In the exemplary arrangement of FIG. 2, the fluid regulator 40 is a lever style direct-operated fluid regulator. The diaphragm case 70 is shaped such that movement of the diaphragm 50 is angularly offset from movement of the valve stem 66, such as along perpendicular axes. The linkage 80 includes a first bracket or rod, such as a pusher post 100, operatively connected to the diaphragm 50 and/or the diaphragm plate 78 to move with the diaphragm 50, and a lever 104 operatively connecting the pusher post 100 to the valve stem 66 to transfer motion of the pusher post 100 in a first direction into motion of the valve stem 66 in a second direction. However, the linkage 80 may take other arrangements suitable for operatively connecting the diaphragm 50 to the valve stem 66 to allow movement of the diaphragm 50 to cause movement of the control element 64 between the first and second positions, as described hereinafter with reference to FIG. 3.

Figure 3:
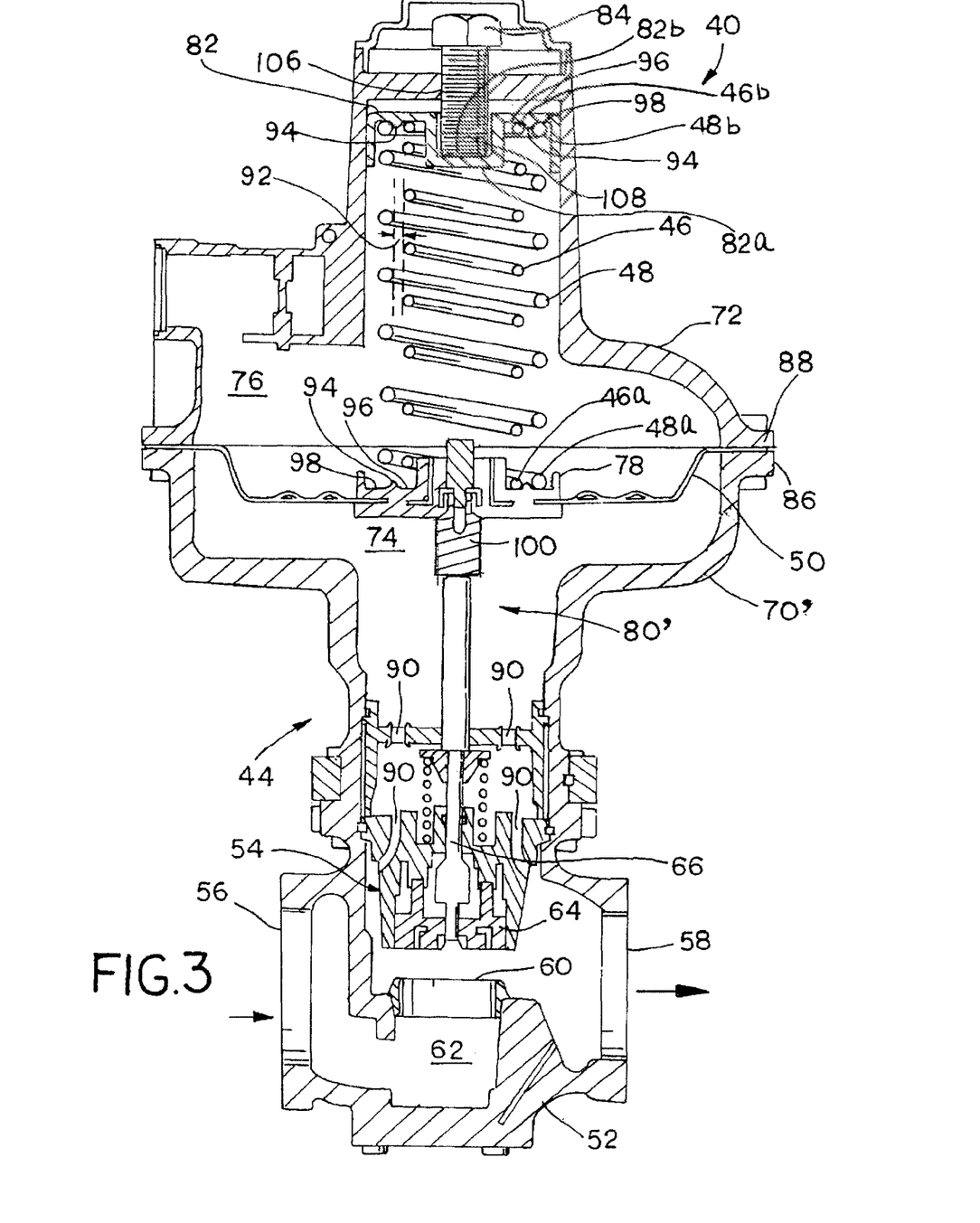
FIG. 3 is a cross-sectional view of a fluid regulator valve according to another exemplary arrangement of the present disclosure.

In the exemplary arrangement of FIG. 3, the fluid regulator 40 is shown with a different exemplary linkage 80' operatively connecting the diaphragm 50 to the valve stem 66. In this arrangement, the fluid regulator 40 is a straight stem style direct-operated fluid regulator. The diaphragm case 70' is shaped such that the movement the diaphragm 50 is along the same axis as movement of the valve stem 66. Therefore, in this arrangement, the linkage 80' does not include the lever 104. Rather, the valve stem 66 is connected directly to the pusher post 100. Other remaining portions of the exemplary arrangement in FIG. 3 are substantially the same as the identically numbered portions in the exemplary arrangement in FIG. 2, the description of which is not repeated here for the sake of brevity.

The adjusting screw 84 extends through a bore 106 in the spring case 72 and has a distal end 108 engaged against a second side of the spring seat 82. The adjusting screw 84 is arranged to adjust the tension in at least one and preferably both of the control springs 46, 48, for example, by threaded engagement with the bore 106 such that turning the adjusting screw 84 clockwise or counterclockwise advances or retracts the spring seat 82 against the control springs 46, 48. In this arrangement, the set pressure for the fluid regulator 40 may be adjusted by turning the adjusting screw 84 to advance or retract the spring seat 82 against the springs 46 and/or 48.

Figure 1:
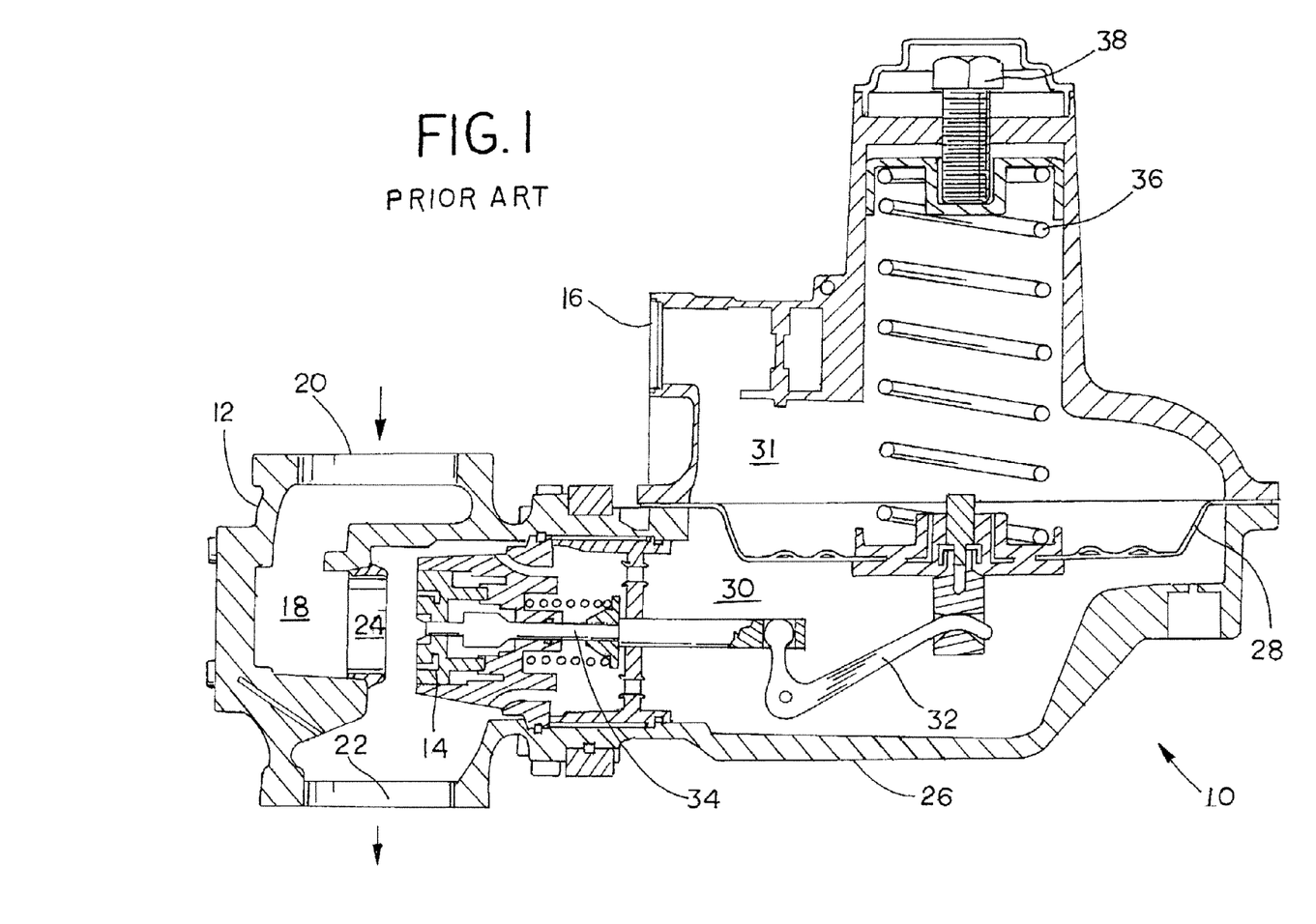
FIG. 1 is cross-sectional view of a fluid regulator according to the prior art.

In some arrangements, an actuator according to the prior art may be modified to include a second control spring in accordance with the present disclosure. Such modification may be performed, for example, by retrofitting a fluid regulator having only a single control spring fixedly operatively connected to the diaphragm, such as the fluid regulator 10, to add a second control spring fixedly operatively connected to the diaphragm to obtain the functionality of the actuator 40 of the present disclosure. To modify the prior art actuator 10, a second control spring, such as the second control spring 46, is supplied. The second control spring control spring 46 is selected to have a different natural frequency than the original control spring 36. For example, the second control spring 46 may have a different shape, such as a different size, diameter, length, and/or thickness, be made of a different material, and/or have a different spring constant. Where the original control spring 36 and the second control spring 46 are both coil springs, the second control spring 46 may be selected to have a different diameter than the original control spring 36, and the smaller diameter control springs may be nested inside of the inner diameter of the larger diameter control spring. For example, the second control spring 46 may be inserted nested inside of and parallel with the original control spring 36. The second spring may be attached or simply disposed against the diaphragm plate carried by the diaphragm 28. In one method, the diaphragm plate may be exchanged for a different diaphragm plate that includes either or both of the protrusion 94 between the control springs 36, 46 and the seating grooves 96, 98. One end of the control springs 36 and 46 may be seated into the seating grooves 98 and 96, respectively. The spring seat 82 may be placed against the opposite ends of the control springs 36 and 46. In this manner, an actuator of a prior art fluid regulator may be converted to an actuator according to the present disclosure.

Each of the optional arrangements described herein may be arranged in any set of combinations or permutations sufficient to provide any combination of one or more functionalities suggested by the description provided herein. Further, it is understood that each of the features disclosed with respect to each exemplary arrangement may be combined in any functional combination, such as to provide any useful combination of functionalities as would be understood by a person of ordinary skill in view of the description as a whole.

One possible benefit of the actuator 44 including at least the first and second control springs 46, 48 arranged to act in parallel against the diaphragm 50 is to reduce regulator instability by having two different natural frequencies to dampen resonant instability and/or reduce valve flutter. Another possible benefit is to be able to achieve a higher spring rate with the parallel arrangement of the first and second control springs 46, 48 in a smaller space than with a single spring.

Numerous other benefits of and modifications to the fluid regulator(s) disclosed herein will be apparent to those skilled in the art in view of the foregoing description. Accordingly, this description is to be construed as illustrative only and is presented for the purpose of enabling those skilled in the art to make and use the fluid regulators and to teach the preferred mode of carrying out the same. The exclusive rights to all modifications within the scope of the disclosure and the appended claims are reserved.

The invention claimed is:

1. A fluid regulator, comprising:
 a regulator body defining a fluid inlet, a fluid outlet, and a fluid flow path connecting the fluid inlet to the fluid outlet; and
 a valve trim including a valve stem and a control element disposed in the fluid flow path, the control element arranged to shift between at least a first position and a second position to control flow of fluid through the fluid flow path from the fluid inlet to the fluid outlet; and
 an actuator comprising:
  a housing including a first case operatively connected to the regulator body and a second case connected to the first case, the first case of the housing forming a first chamber and the second case of the housing forming a second chamber;
  a diaphragm arranged between the first case and the second case to separate the first chamber from the second chamber;
  a first control spring operatively coupled to the diaphragm;
  a second control spring operatively coupled to the diaphragm;
  a first spring seat operatively coupled to the housing, the first spring seat comprising a first seating groove that receives the first control spring, a second seating groove that receives the second control spring, and a first spacer protruding outwardly between the first seating groove and the second seating groove;
  a diaphragm plate connected to the diaphragm, wherein the diaphragm plate forms a second spring seat comprising a third groove that receives the first control spring, a fourth groove that receives the second control spring, and a second spacer;
  wherein the first control spring is disposed between and seated against the first spring seat and the second spring seat and thereby biases the diaphragm in a first direction;
  wherein the second control spring is disposed between and seated against the first spring seat and the second spring seat and thereby biases the diaphragm in the first direction in parallel with and independently of the first spring;
  wherein each of the first and second spacers extends into and maintain a gap between the first control spring and the second control spring; and
  a linkage operatively connecting the control element to the diaphragm;
 wherein the diaphragm is in fluid communication with the fluid outlet via one or more passages formed in the valve trim, and the diaphragm is operatively arranged to move the control element in response to fluid pressure at the fluid outlet, and wherein the first control spring has a first natural frequency, and the second control spring has a second natural frequency different than the first natural frequency.

2. The fluid regulator of claim 1, wherein the first spring seat is disposed in the second chamber.

3. The fluid regulator of claim 1, wherein the first control spring has a first spring constant, and the second control spring has a second spring constant different then the first spring constant.

4. The fluid regulator of claim1, wherein the first control spring has a first length, and the second control spring has a second length different than the first length.

5. The fluid regulator of claim 1, wherein the linkage is disposed in the first chamber, and the first and second control springs are disposed in the second chamber.

6. The fluid regulator of claim 1, wherein each of the first and second control springs is a coil spring, and wherein the first control spring is nested in parallel within the second control spring.

7. The fluid regulator of claim 1, wherein the linkage comprises a lever.

8. The fluid regulator of claim 1, further comprising:
an adjusting screw operatively connected to each of the first and second control springs, wherein adjusting the adjusting screw adjusts a set pressure of the fluid regulator.

9. The fluid regulator of claim 1, wherein the valve stem is operatively coupled to the control element, the linkage having one end connected to the diaphragm and another end connected to the valve stem.

10. The fluid regulator of claim 9, wherein the diaphragm moves along a first axis and the valve stem moves along a second axis perpendicular to the first axis.

11. An actuator for a fluid regulator, comprising:
a housing including a first case and a second case connected to the first case, the first case defining a first chamber and the second case defining a second chamber;
a diaphragm arranged between the first and second case to separate the first chamber from the second chamber, the diaphragm formed of an air impervious flexible material and forming a movable pressure barrier between the first chamber and the second chamber;
a linkage adapted to operatively connect the diaphragm to a valve stem of a valve trim;
a first spring seat disposed in the second chamber and operatively coupled to the housing, the spring seat comprising a first seating groove, a second seating groove, and a first spacer protruding outwardly between the first seating groove and the second seating groove;
a diaphragm plate connected to the diaphragm, wherein the diaphragm plate forms a second spring seat comprising a third groove and a fourth groove;
a first control spring disposed in the second chamber, the first control spring disposed between and seated against the first spring seat and the second spring seat and received in the first seating groove of the first spring seat and in the third seating groove of the second spring seat;
a second control spring disposed in the second chamber, the second control spring disposed between and seated against the first spring seat and the second spring seat and received in the second seating groove of the first spring seat and in the fourth seating groove of the second spring seat;

wherein each of the first control spring and the second control spring biases the diaphragm independently of the other control spring, wherein the spacer extends into a gap between the first control spring and the second control spring, and wherein the diaphragm is movable responsive to a fluid pressure change in the fluid regulator sensed via one or more passages formed in the valve trim.

12. The actuator of claim 11, wherein the first control spring has a different natural frequency than the second control spring.

13. The actuator of claim 11, wherein the first control spring has a different spring constant than the second control spring.

14. The actuator of claim 11, wherein the diaphragm plate is carried by the diaphragm.

15. The actuator of claim 14, wherein each of the first and second control springs is a coil spring, and wherein the first control spring is nested in parallel within the second control spring.

16. The actuator of claim 15, wherein the first control spring is spaced inwardly apart from the second control spring.

17. The actuator of claim 11, wherein the linkage is disposed in the first chamber.

18. The actuator of claim 11, wherein the linkage is co-axial with the first and second control springs.

19. A method of improving stability of a fluid regulator, the method comprising the steps of:
providing a fluid regulator having a regulator body, a valve trim and a control element, and an actuator arranged to control flow of fluid through the regulator body, the actuator including a housing including a first case operatively connected to the regulator body and a second case connected to the first case, a diaphragm disposed in the housing between the first and second cases and operatively arranged to sense a fluid pressure within the regulator body via one or more passages formed in the valve trim, a first spring seat operatively connected to the housing, the first spring seat comprising a first seating groove, a second seating groove, and a first spacer protruding outwardly between the first seating groove and the second seating groove, and a diaphragm plate connected to the diaphragm, the diaphragm plate forming a second spring seat having a third seating groove and a fourth seating groove;
providing a first control spring, wherein the first control spring is selected to have a first natural frequency;
providing a second control spring, wherein the second control spring is selected to have a second natural frequency, and wherein the second natural frequency is different than the first natural frequency;
seating the first control spring in the first seating groove of the first spring seat and in the third seating groove of the second spring seat with the first control spring disposed between the first spring seat and the second spring seat;
seating the second control spring in the second seating groove of the first spring seat and in the fourth seating groove of the second spring seat with the second control spring disposed between the first spring seat and the second spring seat, wherein the spacer extends into a gap between the first control spring and the second control spring and each of the first control spring and second control spring independently biases the diaphragm in parallel.

20. The method of claim 19, wherein the diaphragm plate is carried by the diaphragm.

* * * * *

UNITED STATES PATENT AND TRADEMARK OFFICE
CERTIFICATE OF CORRECTION

PATENT NO. : 9,513,636 B2
APPLICATION NO. : 13/796823
DATED : December 6, 2016
INVENTOR(S) : GuoLei Fan et al.

It is certified that error appears in the above-identified patent and that said Letters Patent is hereby corrected as shown below:

In the Specification

At Column 1, Line 46, "a the" should be -- the --.

At Column 3, Line 66, "FIG. 1 is" should be -- FIG. 1 is a --.

At Column 4, Line 41, "valve body 62" should be -- regulator body 52 --.

At Column 4, Line 61, "valve body 52" should be -- regulator body 52 --.

At Column 5, Line 27, "first ends 46a, 46b" should be -- first ends 46a, 48a --.

At Column 5, Line 30, "first ends 46a, 46b" should be -- first ends 46a, 48a --.

At Column 5, Line 44, "screw 106" should be -- screw 84 --.

At Column 5, Line 45, "may" should be -- may be --.

At Column 5, Line 58, "may a" should be -- may have a --.

At Column 6, Line 10, "form" should be -- form of --.

At Column 7, Line 27, "actuator 40" should be -- actuator 44 --.

At Column 7, Line 28, "actuator 10," should be -- actuator 16, --.

Signed and Sealed this
Twentieth Day of February, 2018

Andrei Iancu
*Director of the United States Patent and Trademark Office*

CERTIFICATE OF CORRECTION (continued)
U.S. Pat. No. 9,513,636 B2

In the Claims

At Column 9, Line 11, "then" should be -- than --.

At Column 9, Line 13, "claim 1" should be -- claim 1, --.